United States Patent
Curtis et al.

(10) Patent No.: US 9,669,317 B2
(45) Date of Patent: *Jun. 6, 2017

(54) SYSTEM AND METHOD FOR ALLOWING AFFILIATIONS TO UTILIZE IN-GAME ITEMS TO ASSIST OTHER PLAYERS

(71) Applicant: KABAM, INC., San Francisco, CA (US)

(72) Inventors: Matthew Curtis, Novato, CA (US); James Koh, Mountain View, CA (US); Kellen Christopher Smalley, Pleasanton, CA (US); Michael C. Caldarone, Palo Alto, CA (US)

(73) Assignee: Kabam, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/247,402

(22) Filed: Aug. 25, 2016

(65) Prior Publication Data
US 2016/0361657 A1    Dec. 15, 2016

Related U.S. Application Data

(63) Continuation of application No. 14/684,666, filed on Apr. 13, 2015, now Pat. No. 9,452,364, which is a
(Continued)

(51) Int. Cl.
| | |
|---|---|
| *A63F 13/10* | (2006.01) |
| *A63F 13/847* | (2014.01) |
| *A63F 13/30* | (2014.01) |
| *A63F 13/87* | (2014.01) |
| *A63F 13/79* | (2014.01) |
| *A63F 13/35* | (2014.01) |

(Continued)

(52) U.S. Cl.
CPC ............ *A63F 13/847* (2014.09); *A63F 13/12* (2013.01); *A63F 13/30* (2014.09); *A63F 13/335* (2014.09); *A63F 13/35* (2014.09); *A63F 13/533* (2014.09); *A63F 13/79* (2014.09); *A63F 13/795* (2014.09); *A63F 13/87* (2014.09); *A63F 2300/407* (2013.01); *A63F 2300/51* (2013.01); *A63F 2300/5533* (2013.01)

(58) Field of Classification Search
CPC ................................ A63F 13/12; A63F 13/10
See application file for complete search history.

(56) References Cited

U.S. PATENT DOCUMENTS

| | | |
|---|---|---|
| 7,717,782 B2 | 5/2010 | VanLuchene |
| 8,267,794 B2 | 9/2012 | VanLuchene |

(Continued)

*Primary Examiner* — Omkar Deodhar
(74) *Attorney, Agent, or Firm* — Sheppard Mullin Richter & Hampton LLP (57) ABSTRACT

One aspect of the disclosure relates to a system configured to provide a virtual space, in accordance with one or more implementations. Users of virtual spaces may encounter barriers in a game. During these barriers, users may receive and/or provide assistance to other affiliation members. One aspect of the disclosure relates to allowing affiliations or other groups to utilize in-game items to assist other players in game progress in an online game. This may incent positive player actions towards affiliation members, may enhance engagement between affiliation members, may provide an incentive for users to join an affiliation, and/or have other results. These results may ultimately contribute to enhanced retention, enhanced monetization, enhanced user satisfaction, and/or other enhancements.

20 Claims, 3 Drawing Sheets

Related U.S. Application Data continuation of application No. 13/874,739, filed on May 1, 2013, now Pat. No. 9,005,032.

(51) Int. Cl.
*A63F 13/335* (2014.01)
*A63F 13/533* (2014.01)
*A63F 13/795* (2014.01)

(56) References Cited

U.S. PATENT DOCUMENTS

| | | |
|---|---|---|
| 9,005,032 B1 | 4/2015 | Curtis |
| 2002/0022520 A1 | 2/2002 | Oe |
| 2007/0087799 A1 | 4/2007 | Luchene |
| 2012/0270646 A1 | 10/2012 | Walker et al. |
| 2012/0283011 A1 | 11/2012 | Van Luchene |
| 2012/0283014 A1 | 11/2012 | Van Luchene |
| 2013/0059663 A1 | 3/2013 | Kurlancheek |

SYSTEM AND METHOD FOR ALLOWING AFFILIATIONS TO UTILIZE IN-GAME ITEMS TO ASSIST OTHER PLAYERS

FIELD

The disclosure relates to allowing affiliations or other groups to utilize in-game items to assist other players' progress.

BACKGROUND

Various techniques for providing in-game items to players to assist in the operation, administration, and/or performance of a virtual world are known. Acquiring in game items based on players interaction with and performance in an online game is also known. Conventional systems, however, suffer from various drawbacks such as creating a competitive environment so that players may individually acquire in-game items based on skill. For example, conventional systems may fail to create positive player actions towards their affiliation members, resulting in more competitive and individualized game play.

SUMMARY

One aspect of the disclosure relates to a system configured to provide a virtual space, in accordance with one or more implementations. Users of virtual spaces may encounter barriers in a game. During these barriers, users may receive and/or provide assistance to other affiliation members. One aspect of the disclosure relates to allowing affiliations or other groups to utilize in-game items to assist other players in game progress in an online game. An affiliation may include an alliance, team, guild, cohort, and/or other affiliation with a discrete group of users. This may incent positive player actions towards affiliation members, may enhance engagement between alliance members, may provide an incentive for users to join an affiliation, and/or have other results. These results may ultimately contribute to enhanced retention, enhanced monetization, enhanced user satisfaction, and/or other enhancements. In some implementations, the system may include one or more servers. The server(s) may be configured to communicate with one or more client computing platforms according to a client/server architecture. The users may access the system and/or the virtual spaces via the client computing platforms, in for instance, one or more games.

The server may be configured to execute one or more computer program modules. The computer program modules may include one or more of a user module, a space module, an interaction module, a relationship module, a network module, a user account module, an assistance module and/or other modules.

The space module may be configured to execute an instance of a virtual space. The instance of the virtual space may be implemented to facilitate participation by the users in an online game. The space module may be configured to facilitate interaction of the users with the virtual space by executing actions in the instance of the virtual space in response to receiving action requests from the users. The executed actions may require one or both of time and/or a virtual resource.

The user account module may be configured to store inventories of resources that may be available to users in the virtual space. The inventories may include a first inventory of resources available to a first user in the virtual space, a second inventory of resources available to a second user in the virtual space, and/or other inventories.

Various matters may be collected in an inventory. These matters may include, but are not limited to, virtual items, virtual resources, character attributes, and/or character skills. A virtual item may be an item that may be used in a virtual world to assist a player's character. Examples of virtual items include, but are not limited to, valuables (money, valuable metals or gems, etc.), weapons, spell components, defense components, and/or armor. A virtual resource may be a resource that may be used in the virtual world to create game attributes. Examples of virtual resources include wood, stone, herbs, water, ores, animals, monsters, bosses, NPCs, building materials, potions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

The relationship module may be configured to store associations of the users in the online game within the virtual space with affiliations. The affiliations may include a first affiliation and/or other affiliations. One or more of the first user, the second user, and/or other users may be associated with the first affiliation.

The assistance module may be configured to receive a request for assistance from a first user of the first affiliation. The assistance module may effectuate presentation of information related to the request to other members of the first affiliation. The assistance module may receive an assistance input from the second user of the first affiliation. The assistance input may be provided by the second user responsive to presentation of the request. The assistance module may effectuate provision of the assistance from the second user to the first user in response to reception of the assistance input. Provision of the assistance from the second user may deplete resources from the second inventory.

In some implementations, the inventories include a third inventory of resources available to a third user in the virtual space and/or a fourth inventory of resources available to a fourth user in the virtual space. The affiliations comprise a second affiliation to which the third user and/or the fourth user may be associated.

The assistance module may be configured to receive a request for assistance from a third user of the second affiliation. The assistance module may effectuate presentation of information related to the request to other members of the second affiliation. The assistance module may receive an assistance input from the fourth user of the second affiliation. The assistance module may effectuate a provision of the assistance from the fourth user to the third user in response to reception of the assistance input, wherein provision of the assistance from the fourth user may deplete resources from the fourth inventory and/or any other inventory.

In some implementations, the received assistance may comprise making the initiation of an action possible, speeding up a wait time, or eliminating the wait time. In some implementations, the assistance from the second user helps the first user and/or any other user complete one or more game play loops comprising: training, building, researching, General/Knight/Hero/Character leveling, marching, and defending.

In some implementations, the received assistance from the second user may be without any compensation in the form of resources becoming available to the second user. In some implementations, the received assistance from the second user may deplete a virtual currency from the second inventory. In some implementations, the received assistance from the second user may deplete an in-game item from the second inventory. In some implementations, the received assistance from the second user may deplete an in-game item from the second inventory permanently. In some implementations, the received assistance from the second user may deplete an in-game item from the second inventory temporarily. In some implementations, the request for assistance may be only viewed by other users in the first affiliation.

In some implementations, a computer-implemented method of providing assistance to users may be implemented in a computer system comprising one or more physical processors. The method may comprise executing an instance of a virtual space to facilitate participation by the users in an online game. The space module may be configured to facilitate interaction of the users with the virtual space by executing actions in the instance of the virtual space in response to receiving action requests from the users. The executing actions may require one or both of time and/or a virtual resource and/or any other any other action.

In some implementations inventories of resources that may be available to users in the virtual space may be stored. The inventories may include a first inventory of resources available to a first user in the virtual space and/or a second inventory of resources available to a second user in the virtual space, and/or any other inventory available to any other user.

Associations of the users in the online game within the virtual space with affiliations may be stored. The affiliations may comprise a first affiliation to which the first user and/or the second user may be associated. The affiliations may receive a request for assistance from a first user of the first affiliation. The affiliation may effectuate presentation of information related to the request to other members of the affiliation. The affiliation may receive an assistance input from the second user of the first affiliation, and/or effectuate provision of the assistance from the second user to the first user in response to reception of the assistance input. Provision of the assistance from the second user and/or any other user may deplete resources from the second inventory and/or any other inventory.

These and/or other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
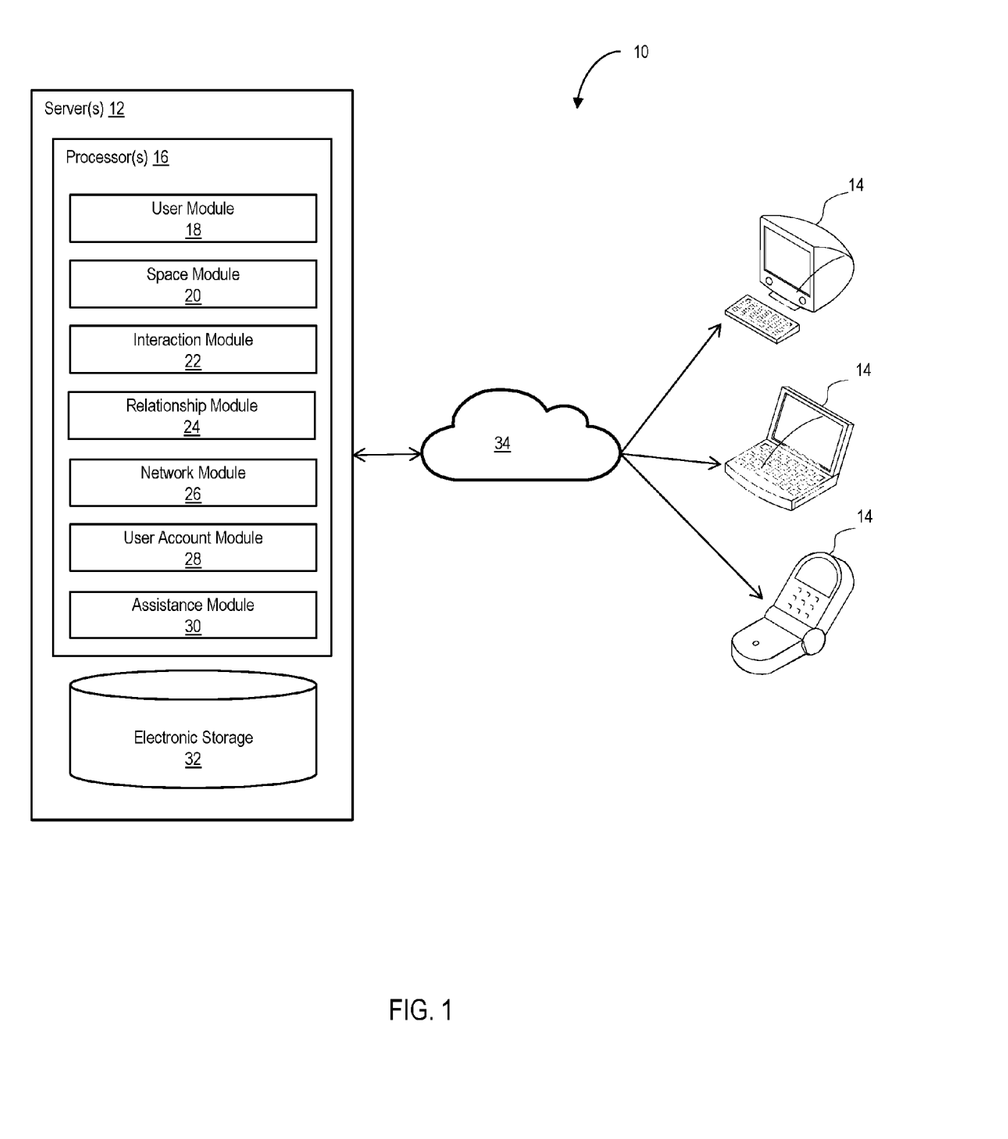
FIG. 1 illustrates an exemplary system configured to provide allowing affiliations or other groups to utilize in-game items to assist other players' progress, according to an aspect of the invention.

FIG. 1 illustrates a system 10 configured to provide allowing affiliations or other groups to utilize in-game items to assist other players in-game progress in an online game. In some implementations, system 10 may include a game server 12. The game server 12 may host a game space in which an online game takes place. The game server 12 may be configured to communicate with one or more client computing platforms 14 according to a client/server architecture. The users may access system 10 and/or the virtual space via client computing platforms 14.

The game server 12 may be configured to execute one or more computer program modules. The computer program modules may include one or more of a user module 18, a space module 20, an interaction module 22, a relationship module 24, a network module 26, a user account module 28, an assistance module 30, and/or other modules.

The user module 18 may be configured to access and/or manage one or more user profiles and/or user information associated with users of the system 10. The one or more user profiles and/or user information may include information stored by game server 12, one or more of the client computing platforms 14, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

Space module 20 may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. The space module may be configured to facilitate interaction of the users with the virtual space by executing actions in the instance of the virtual space in response to receiving action requests from the users. The executed actions may require one or both of time and/or a virtual resource.

Expressions of the instance executed on the clients may facilitate presentation of views on the clients of the virtual space. Expressions of the instance executed on the clients may be configured to simply present views of the virtual space based on the state information (e.g., via streaming view information, object/position information, and/or other state information) received from space module 20. Expressions of the instance executed on the clients may include space logic that effectively provides for execution of a limited version of the instance on a client that is synchronized and/or verified with state information received from space module 20. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The instance of the virtual space may comprise one or more user selectable actions. A user selectable action may be associated with a wait time. A wait time associated with an action may prevent an execution of a number of corresponding actions for an amount of time after receiving a request for the action. In a virtual space such as an online game, a wait time may be associated with a time required to complete an action. In such cases, an action may comprise, for example, developing a skill, building, crafting, modifying, upgrading, trading, selling, and/or repairing an item, an equipment, a building, and/or a structure; training, building, modifying, healing, requesting, upgrading, selling, and/or repairing an in-game unit; harvesting, refining, trading, selling, developing, spending, and/or consuming an in-game resource; using, performing, developing, modifying, upgrading, and/or training a skill, ability, and/or attribute; completing in-game travel, reloading a weapon, receiving assistance such as a hint and/or a clue, and/or other actions. For example, in a game involving building virtual structures, a wait time may be associated with the time it takes for a virtual structure to be built, upgraded, and/or repaired. In another example involving a game with an aspect related to the development of a character, a wait time may be associated with the time it takes to use a skill and/or ability such as a melee attack or a spell; and/or to interact with another player and/or a non-player character. In yet another example involving a game with an aspect related to the development of an army, a wait time may be associated with the time it takes to harvest resources and/or to build units.

A wait time may be associated with a time required to recover from completing an in-game action. In such cases, an action may comprise, for example, developing a skill, building, crafting, modifying, upgrading, trading, selling, and/or repairing an item, an equipment, a building, and/or a structure; training, building, modifying, healing, requesting, upgrading, selling, and/or repairing an in-game unit; harvesting, refining, trading, selling, developing, spending, and/or consuming an in-game resource; using, performing, developing, modifying, upgrading, and/or training a skill, ability, and/or attribute; completing in-game travel, reloading a weapon, receiving assistance such as a hint and/or a clue, and/or other actions. For example, in a game involving building virtual structures, a wait time may be associated with the time it takes to recover the amount of resources spent when building, upgrading, and/or repairing a virtual structure. In another example involving a game with an aspect related to the development of a character, a wait time may be associated with the time it takes to recover energy used when activating a skill and/or ability such as a melee attack or a spell; and/or to interact with another player and/or a non-player character. In yet another example involving a game with an aspect related to the development of an army, a wait time may be associated with the time it takes recover from requesting special limited use units, abilities, and/or powers.

In some cases, a wait time may be associated with a time required to both complete an action and/or recover from completing the action. In addition, a person of skill in the art will appreciate that a wait time may be static or dynamic depending on the conditions of the game. For instance and without limitation, a wait time may depend on the number of other players requesting the same action and/or a similar action type. A person of skill in the art will appreciate that in some cases a virtual space may allow a player to queue action requests. In such cases, the wait time may be the wait time associated with one or more actions in the queue.

In some instances, wait times may be shortened or eliminated through the use of accelerators. Accelerators may include, for example, effects of actions taken by other players, the use of an in-game item, spending in-game money and/or resources, spending real world currency, spending earned or purchased, using an in-game power-up, and/or other accelerators. Accelerators may shorten wait time by, without limitation, reducing the overall wait time, accelerating the speed with which the wait time passes, shifting the wait time to another action, eliminating the wait time, and/or other methods.

In other instances, wait times may be lengthened through the use of penalties. Penalties may include, for example, effects of actions taken by other players, the use of an in-game item, spending in-game money and/or resources, spending real world currency, spending earned or purchased, using an in-game power-up, and/or other penalties. Penalties may lengthen a wait time by, without limitation, increasing the overall wait time, decreasing the speed with which the wait time passes, shifting the wait time from another action, and/or other methods.

In some instances, the amount of wait time remaining may be presented to the user of the virtual space. In a setting such as a game, the wait time may be presented as a countdown timer, a progress bar, a mask overlaying an action request indicating it may not be selected, and/or other methods of presenting a wait time.

In some cases, wait times may apply to subsequent requests of the same action, and in yet other cases, wait times may apply to subsequent requests of the same action type. Action types may include building structures, items, equipment, and/or units; upgrading structures, items, equipment, and/or units; repairing structures, items, equipment, and/or units; upgrading skills and/or abilities; utilizing skills and/or abilities; harvesting resources; researching technology; trading items, equipment, and/or resources; traveling; and/or other action types.

The above description of the views of the virtual space determined from the instance executed by space module 20 is not intended to be limiting. The virtual space may be presented in a more limited, or richer, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space may be contemplated.

Within the instance of the virtual space executed by space module 20, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and/or interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user may use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and/or entered by the users via respective client computing platforms 14. Communications may be routed to and/or from the appropriate users through game server 12 (e.g., through space module 20).

The interaction module 22 may be configured to monitor interactions of the users with the virtual space and/or each other within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction module 22 in monitoring the interactions of the users may be stored to the user profiles managed by user module 18.

At a given time, interaction module 22 may determine a set of users that may be currently engaged with the virtual space and/or a set of users that may not be currently engaged with the virtual space. Being engaged with the virtual space may refer to being logged in to the virtual space, performing some action or interaction within the virtual space within some period of time (e.g., the last 2 minutes), and/or other taking some other action indicating ongoing and/or contemporaneous engagement with the virtual space.

The interaction module 22 may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

The relationship module 24 may be configured to establish relationships between users within the virtual space. The relationship module 24 may be configured to store associations of the users in the online game within the virtual space with affiliations, the affiliations comprising a first affiliation to which the first user and/or the second user may be associated. Such relationships may include one or more of friendships, guilds (with guild-mates), affiliations, connections, followers, and/or other relationships.

The relationship module 24 may be configured to store associations of the users in the online game within the virtual space with affiliations. The affiliations may include a first affiliation and/or other affiliations. One or more of the first user, the second user, and/or other users may be associated with the first affiliation.

The relationship module 24 may establish relationships based on relationship requests and/or acceptances received from users. Establishment of a relationship may be initiated by a single communication (e.g., a request) initiated by a given user requesting a relationship between the given user and/or one or more other users. Establishment of a relationship may require a first communication from the given user to be approved by the one or more other users. Relationships may include one or more types of relationships that have a functional purpose or impact within the virtual space, and/or one or more types of relationships of a social construct within the virtual space that does not have a functional result.

Network module 26 of the game server 12 may be configured to maintain a connection to the one or more client computing platforms 14. For example, the network module 26 may maintain one or more communication lines or ports to enable connection and/or exchange of information with a network 40 and/or other computing platforms 14. Information such as state information, game state and/or game logic may be communicated via network module 26. The network module may be configured to receive information from the client computing platform 14 as well.

The user account module 28 may be configured to store inventories of resources that may be available to users in the virtual space. The inventories may include a first inventory of resources available to a first user in the virtual space, a second inventory of resources available to a second user in the virtual space, and/or other inventories.

Various matters may be collected in an inventory. These matters may include, but are not limited to, virtual items, virtual resources, character attributes, and/or character skills. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, NPCs, building materials, potions, etc. A character attribute may be any quality, trait, feature and/or any characteristic a particular character can have. Character attributes may include, but are not limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

The assistance module 30 may be configured to receive a request for assistance from a first user of the first affiliation. The assistance module 30 may effectuate presentation of information related to the request to other members of the first affiliation. The assistance module 30 may receive an assistance input from the second user and/or any other user of the first affiliation and/or any other affiliation. The assistance input may be provided by the second user responsive to presentation of the request. The assistance module may effectuate provision of the assistance from the second user to the first user in response to reception of the assistance input. Provision of the assistance from the second user may deplete resources from the second inventory and/or any other inventory.

In some implementations, the inventories include a third inventory of resources available to a third user in the virtual space and/or a fourth inventory of resources available to a fourth user in the virtual space. The affiliations comprise a second affiliation to which the third user and/or the fourth user may be associated.

The assistance module 30 may be configured to receive a request for assistance from a third user of the second affiliation. The assistance module may effectuate presentation of information related to the request to other members of the second affiliation. The assistance module may receive an assistance input from the fourth user of the second affiliation. The assistance module may effectuate a provision of the assistance from the fourth user to the third user in response to reception of the assistance input, wherein provision of the assistance from the fourth user may deplete resources from the fourth inventory and/or any other inventory.

In some implementations, there may be any number of players in an affiliation and/or there may be a fixed number of players in an affiliation. In some implementations, the affiliations may be based on character attributes. Character attributes may be any quality, trait, feature or characteristic a particular character can have that may be stored in the corresponding character account. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking.

In some implementations, the affiliations may be based on character skills. Character skills may be game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

In some implementations, the received assistance may comprise making the initiation of an action possible, speeding up a wait time, or eliminating the wait time. In some implementations, the assistance from the second user helps the first user complete one or more game play loops comprising: training, building, researching, General/Knight/Hero/Character leveling, marching, and/or defending.

In some implementations, the received assistance from the second user may be without any compensation in the form or resources becoming available to the second user. In some implementations, the received assistance from the second user may deplete a virtual currency from the second inventory. In some implementations, the received assistance from the second user may deplete an in-game item from the second inventory. In some implementations, the received assistance from the second user may deplete an in-game item from the second inventory permanently. In some implementations, the received assistance from the second user may deplete an in-game item from the second inventory temporarily. In some implementations, the request for assistance may be viewed by other users in the first affiliation.

The game server 12, client computing platforms 14, and/or external resources may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game servers 12, client computing platforms 14, and/or external resources may be operatively linked via some other communication media.

Game server 12 may include electronic storage 32, one or more processors 16, and/or other components. Game server 12 may include communication lines, or ports to enable the exchange of information with a network 46 and/or other computing platforms 14. Illustration of game server 12 in FIG. 1 is not intended to be limiting. Game server 12 may include a plurality of hardware, software, and/or firmware components operating together to provide the functionality attributed herein to game server 12. For example, game server 12 may be implemented by a cloud of computing platforms operating together as game server 12.

Electronic storage 32 may comprise non-transitory storage media that electronically stores information. The electronic storage media of electronic storage 32 may include one or both of system storage that is provided integrally (i.e., substantially non-removable) with game server 12 and/or removable storage that is removably connectable to game server 12 via, for example, a port (e.g., a USB port, a firewire port, etc.) or a drive (e.g., a disk drive, etc.). Electronic storage 32 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 32 may include one or more virtual storage resources (e.g., cloud storage, a virtual private network, and/or other virtual storage resources). Electronic storage 32 may store software algorithms, information determined by processor 16, information received from game server 12, information received from client computing platforms 14, and/or other information that enables game server 12 to function as described herein.

Processor(s) 16 may be configured to provide information processing capabilities in game server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. The processor 16 may be configured to execute modules 18, 20, 22, 24, 26, 28, and/or 30. Processor 16 may be configured to execute modules 18, 20, 22, 24, 26, 28, and/or 30 by software; hardware; firmware; some combination of software, hardware, and/or firmware; and/or other mechanisms for configuring processing capabilities on processor 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, 24, 26, 28, and/or 30 are illustrated in FIG. 1 as being implemented within a single processing unit, in implementations in which processor includes multiple processing units, one or more of modules 18, 20, 22, 24, 26, 28, and/or 30 may be implemented remotely from the other modules. The description of the functionality provided by the different modules 18, 20, 22, 24, 26, 28, and/or 30 28 described below is for illustrative purposes, and/or is not intended to be limiting, as any of modules 18, 20, 22, 24, 26, 28, and/or 30 may provide more or less functionality than is described. For example, one or more of modules 18, 20, 22, 24, 26, 28, and/or 30 may be eliminated, and/or some or all of its functionality may be provided by other ones of modules 18, 20, 22, 24, 26, 28, and/or 30. As another example, processor 16 may be configured to execute one or more additional modules that may perform some or all of the functionality attributed below to one of modules 18, 20, 22, 24, 26, 28, and/or 30.

A given client computing platform 14 may include one or more processors configured to execute computer program modules. The computer program modules may be configured to enable an expert or user associated with the given client computing platform 14 to interface with system 10, game server 12, and/or external resources, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

Figure 2:
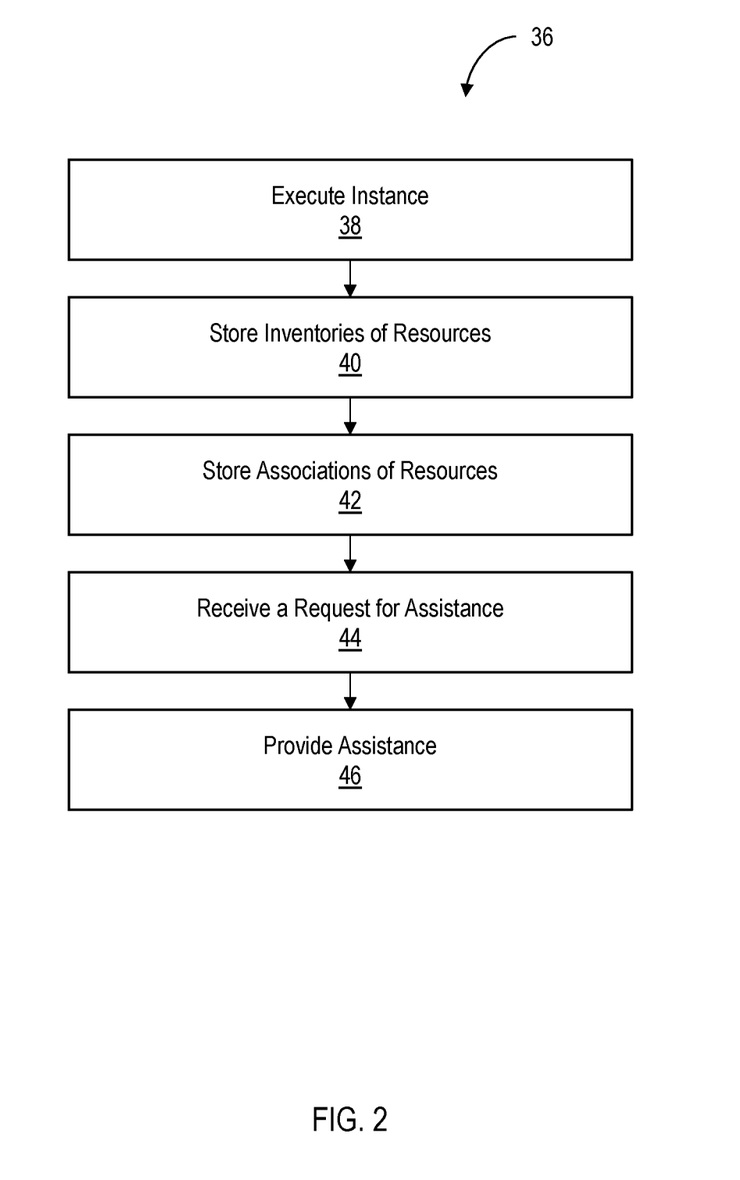
FIG. 2 illustrates an exemplary method of allowing affiliations or other groups to utilize in-game items to assist other players' progress, according to an aspect of the invention.

FIG. 2 illustrates an exemplary method 36 of allowing affiliations or other groups to utilize in-game items to assist other players' progress, according to an aspect of the invention. The operations of method 36 presented below are intended to be illustrative. In some embodiments, method 36 may be accomplished with one or more additional operations not described, and/or without one or more of the operations discussed. The order in which the operations of method 36 are illustrated in FIG. 2 and described below is not intended to be limiting.

In some embodiments, method 36 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 36 in response to instructions stored electronically on an electronic storage medium. The one or more processing devices may include one or more devices configured through hardware, firmware, and/or software to be specifically designed for execution of one or more of the operations of method 36.

At an operation 38, an instance of a virtual space may be executed. In some implementations, operation 38 may be performed by a space module the same as or similar to space module 20 (shown in FIG. 1 and described above). In some implementations, the method may be configured to facilitate interaction of the users with the virtual space by executing actions in the instance of the virtual space in response to receiving action requests from the users, where the executing actions requires one or both of time and/or a virtual resource.

At an operation 40, inventories of resources may be stored. In some implementations, operation 40 may be performed by a user account module 28 (shown in FIG. 1 and described above). In some implementations, operation 40 may store inventories of resources that may be available to users in the virtual space, the inventories including a first inventory of resources available to a first user in the virtual space and/or a second inventory of resources available to a second user in the virtual space.

At an operation 42, associations of resources may be stored. In some implementations, operation 42 may be performed by a relationship module 24 (shown in FIG. 1 and described above). In some implementations, operation 42 may store associations of the users in the online game within the virtual space with affiliations, the affiliations comprising a first affiliation to which the first user and/or the second user may be associated.

At an operation 44, request for assistance may be received. At operation 46, assistance may be provided. In some implementations, operations 44 and/or 46 may be performed by an assistance module the same as or similar to assistance module 30 (shown in FIG. 1 and described above). In some implementations, operations 44 and/or 46 may receive a request for assistance from a first user of the first affiliation. Operations 44 and 46 may effectuate presentation of information related to the request to other members of the affiliation. Operations 44 and/or 46 may receive an assistance input from the second user of the first affiliation, and/or effectuate provision of the assistance from the second user to the first user in response to reception of the assistance input. The provision of the assistance from the second user may deplete resources from the second inventory.

Figure 3:
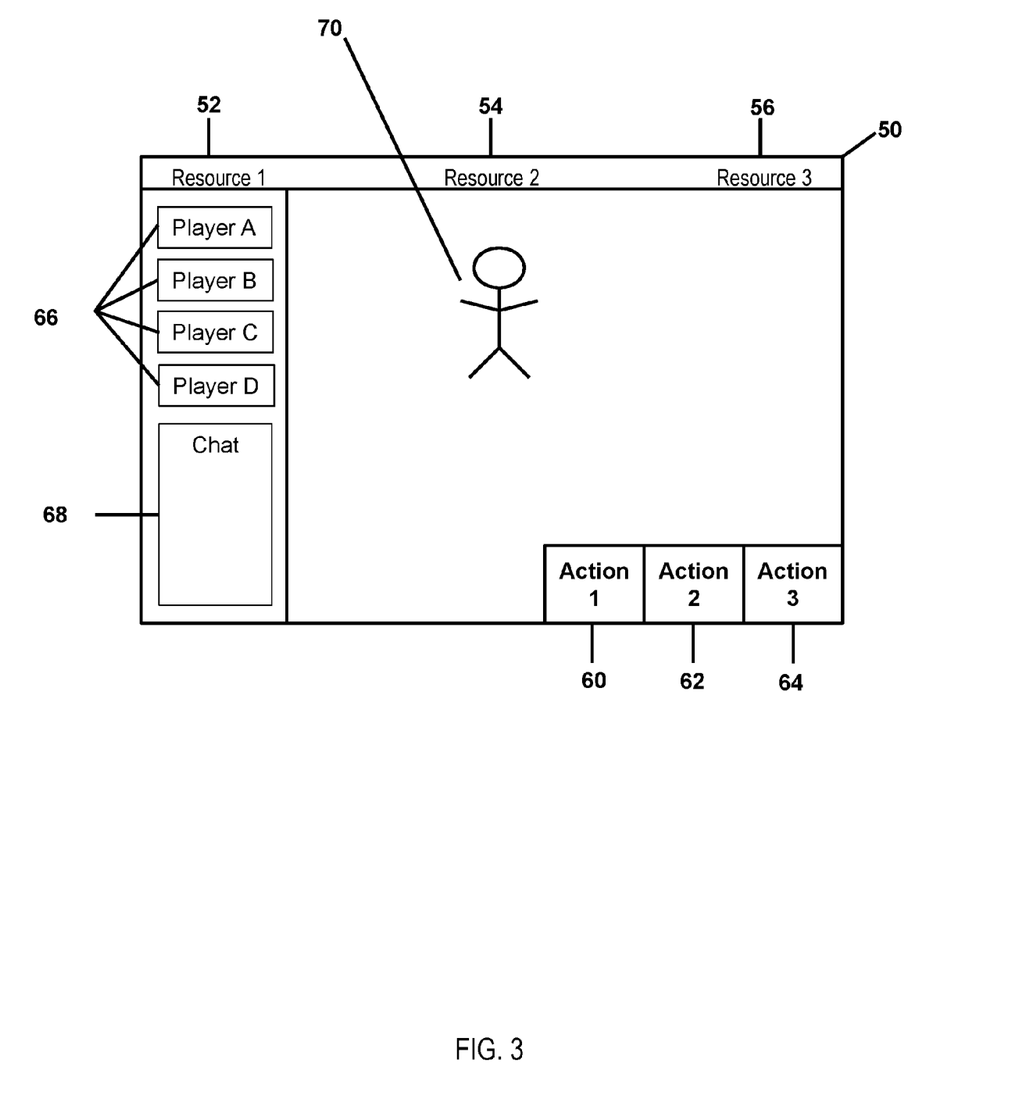
FIG. 3 illustrates an exemplary game space depicting allowing affiliations or other groups to utilize in-game items to assist other players' progress, according to an aspect of the invention.

FIG. 3 illustrates an embodiment of a virtual space interface 50, according to an aspect of the invention. Virtual space interface 50 may be configured to display a virtual character 70. Virtual space interface 50 may be configured to display a plurality of resources 52, 54, and/or 56. Virtual space interface 50 may be configured to allow a user to chat 68 with affiliation members 66 and/or request assistance. Virtual space interface 50 may be configured to allow a user to select a plurality of actions 60, 62, and/or 64 based on assistance received. It should be appreciated that other layouts of virtual space interface 50 may be contemplated.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation may be combined with one or more features of any other implementation.

What is claimed is:

1. A system configured to facilitate providing assistance between users, the system comprising:
one or more physical processors configured by machine-readable instructions to:
execute an instance of a virtual space, and to implement the instance of the virtual space to facilitate participation by the users in an online game and to facilitate interaction of the users with the virtual space by executing actions in the instance of the virtual space in response to receiving action requests from the users;
store inventories of resources that are available to users in the virtual space, the inventories including a first inventory of resources available to a first user in the virtual space and a second inventory of resources available to a second user in the virtual space;
store associations of the users in the online game within the virtual space with affiliations wherein the affiliations comprise a discrete group of three or more users, the affiliations comprising a first affiliation comprising a first discrete group of users to which the first user and the second user are associated; and
receive a request for assistance from a first user of the first affiliation, effectuate presentation of information related to the request to other members of the affiliation, receive an assistance input from the second user of the first affiliation, the assistance input including one or more virtual items and/or resources included in the second inventory of resources to be provided by the second user, and effectuate provision of the assistance from the second user to the first user in response to reception of the assistance input, wherein provision of the assistance from the second user depletes the one or more virtual items and/or resources from the second inventory.

2. The system of claim 1, wherein the inventories include a third inventory of resources available to a third user in the virtual space and a fourth inventory of resources available to a fourth user in the virtual space; wherein the affiliations comprise a second affiliation to which the third user and the fourth user are associated; and wherein the one or more processors are further configured by machine-readable instructions to receive a request for assistance from a third user of the second affiliation, effectuate presentation of information related to the request to other members of the second affiliation, receive an assistance input from the fourth user of the second affiliation, and effectuate provision of the assistance from the fourth user to the third user in response to reception of the assistance input, wherein provision of the assistance from the fourth user depletes resources from the fourth inventory.

3. The system of claim 1, wherein the received assistance comprises making the initiation of an action possible, speeding up a wait time, or eliminating the wait time.

4. The system of claim 1, wherein the assistance from the second user helps the first user complete one or more game play loops comprising: training, building, researching, General/Knight/Hero/Character leveling, marching, and/or defending.

5. The system of claim 1, wherein the received assistance from the second user is without any compensation in the form or resources becoming available to the second user.

6. The system of claim 1, wherein the received assistance from the second user depletes a virtual currency from the second inventory.

7. The system of claim 1, wherein the received assistance from the second user depletes an in-game item from the second inventory.

8. The system of claim 7, wherein the received assistance from the second user depletes an in-game item from the second inventory permanently.

9. The system of claim 7, wherein the received assistance from the second user depletes an in-game item from the second inventory temporarily.

10. The system of claim 1, wherein the request for assistance is only viewed by other users in the first affiliation.

11. A computer-implemented method of providing assistance to users, the method being implemented in a computer system comprising one or more physical processors, the method comprising:
executing an instance of a virtual space, and implementing the instance of the virtual space to facilitate participation by the users in an online game, wherein facilitating interaction of the users with the virtual space by executing actions in the instance of the virtual space in response to receiving action requests from the users;
storing inventories of resources that are available to users in the virtual space, the inventories including a first inventory of resources available to a first user in the virtual space and a second inventory of resources available to a second user in the virtual space;
storing associations of the users in the online game within the virtual space with affiliations wherein the affiliations comprise a discrete group of three or more users, the affiliations comprising a first affiliation comprising a first discrete group of users to which the first user and the second user are associated; and receiving a request for assistance from a first user of the first affiliation, effectuate presentation of information related to the request to other members of the affiliation, receive an assistance input from the second user of the first affiliation, the assistance input including one or more virtual items and/or resources included in the second inventory of resources to be provided by the second user, and effectuate provision of the assistance from the second user to the first user in response to reception of the assistance input, wherein provision of the assistance from the second user depletes the one or more virtual items and/or resources from the second inventory.

12. The method of claim 11, wherein the inventories include a third inventory of resources available to a third user in the virtual space and a fourth inventory of resources available to a fourth user in the virtual space; wherein the affiliations comprise a second affiliation to which the third user and the fourth user are associated; and wherein the method further comprises receiving a request for assistance from a third user of the second affiliation, effectuate presentation of information related to the request to other members of the second affiliation, receive an assistance input from the fourth user of the second affiliation, and effectuate provision of the assistance from the fourth user to the third user in response to reception of the assistance input, wherein provision of the assistance from the fourth user depletes resources from the fourth inventory.

13. The method of claim 11, wherein the received assistance comprises making the initiation of an action possible, speeding up a wait time, or eliminating the wait time.

14. The method of claim 11, wherein the assistance from the second user helps the first user complete one or more game play loops comprising: training, building, researching, General/Knight/Hero/Character leveling, marching, and/or defending.

15. The method of claim 11, wherein the received assistance from the second user is without any compensation in the form or resources becoming available to the second user.

16. The method of claim 11, wherein the received assistance from the second user depletes a virtual currency from the second inventory.

17. The method of claim 11, wherein the received assistance from the second user depletes an in-game item from the second inventory.

18. The method of claim 17, wherein the received assistance from the second user depletes an in-game item from the second inventory permanently.

19. The method of claim 17, wherein the received assistance from the second user depletes an in-game item from the second inventory temporarily.

20. The method of claim 11, wherein the request for assistance is only viewed by other users in the first affiliation.

* * * * *